United States Patent [19]

Ernst

[11] Patent Number: 4,517,742

[45] Date of Patent: May 21, 1985

[54] APPARATUS AND METHOD FOR CORRECTING ERRORS IN A LENGTH OR ANGLE MEASURING SYSTEM

[75] Inventor: Alfons Ernst, Traunreut, Fed. Rep. of Germany

[73] Assignee: Dr. Johannes Heidenhain GmbH, Traunreut, Fed. Rep. of Germany

[21] Appl. No.: 494,109

[22] Filed: May 12, 1983

[30] Foreign Application Priority Data

Jun. 26, 1982 [DE] Fed. Rep. of Germany ....... 3224005

[51] Int. Cl.³ .............................................. G01B 11/04
[52] U.S. Cl. ................................ 33/125 C; 250/237 G
[58] Field of Search ............ 33/125 R, 125 A, 125 C, 33/125 T, DIG. 3; 250/237 G

[56] References Cited

U.S. PATENT DOCUMENTS 4,160,328  7/1979  Ernst .................................. 33/125 C
4,170,826  10/1979  Holstein ............................ 33/125 C
4,198,757  4/1980  Nelle et al. ........................ 33/125 C
4,400,880  8/1983  Nelle ................................. 33/125 C

FOREIGN PATENT DOCUMENTS 3008384  9/1981  Fed. Rep. of Germany .... 33/125 R

Primary Examiner—Richard R. Stearns
Attorney, Agent, or Firm—Willian, Brinks, Olds, Hofer, Gilson & Lione Ltd.

[57] ABSTRACT

A measuring scale carrier for a longitudinal or angle measuring system is stretched and contracted in a localized manner in order to bring about a desired error correction course through the generation of localized longitudinally extending forces in the carrier. A number of approaches for generating these localized longitudinally extending forces are described, including the use of spring elements mounted on the carrier and the localized variation of a predetermined longitudinal tension in the carrier.

21 Claims, 26 Drawing Figures 4,517,742

APPARATUS AND METHOD FOR CORRECTING ERRORS IN A LENGTH OR ANGLE MEASURING SYSTEM

BACKGROUND OF THE INVENTION

The present invention relates to an improved error correction system for a length or angle measuring device of the type comprising a graduation carrier, which includes a measuring graduation, and a scanning unit, which scans the measuring graduation, wherein the scanning unit and the carrier are adapted to be coupled to two objects which are movable with respect to each other.

A variety of error correction systems for such measuring devices are known to the art. For example, in German DE-AS 25 18 745 there is described a length measuring system in which a linear error correction is brought about by means of a device for elongating or compressing the measuring scale. This device engages the two opposed ends of the scale, and a nonlinear error correction is therefore not possible.

In German DE-AS 27 35 154 there is disclosed a position measuring system in which the measuring scale is deflected at at least one point substantially transversely to the graduation plane in order to bring about desired error corrections. This transverse deflection is brought about by either pressure or traction forces applied to the scale transversely to the graduation plane in correspondence with the desired error correction. Such transverse deflections of a scale bring with them disadvantages when the scanning unit is not guided directly on the graduation plane of the scale. In this case, spacing fluctuations between the scanning unit and the graduation plane of the scale can arise.

SUMMARY OF THE INVENTION

The present invention is directed to a simple method and apparatus for correcting errors in a length or angle measuring device, which can be adapted for a wide range of measuring instruments, and which is well suited for the correction of graduation errors and/or machine errors.

According to this invention, a length or angle measuring device of the type described above is provided with means for applying longitudinal forces to the carrier, which forces vary along the longitudinal extent of the carrier to cause localized variations in the length of the carrier, in order to bring about nonlinear length variations in the graduation in accordance with the desired error correction course. In some forms of this invention, the carrier is provided with means for developing a preset longitudinal tension in the carrier, and means are provided for varying the preset longitudinal tension in the carrier along the longitudinal extent of the carrier to cause localized length variations of the carrier in order to bring about nonlinear length variations in the graduation accordance with the desired error correction course.

This invention provides the particular advantage that both linear and nonlinear error corrections can be provided with a relatively great range of error correction, without disturbing the levelness or evenness of the graduation surface of the scale.

The invention itself, together with further objects and attendant advantages, will best be understood by reference to the following detailed description, taken in conjunction with the accompanying drawings.

BRIEF DESCRIPTION OF THE DRAWINGS

FIG. 1b is a longitudinal sectional view taken along line 1b—1b of FIG. 1a.

2a is a top plan view of a scale which incorporates a first preferred embodiment of this invention.

Figure 2A:
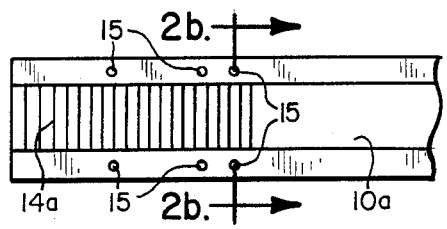
Figure 2B:
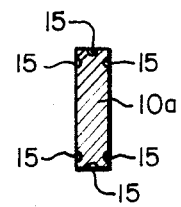

FIG. 2b is a cross-sectional view taken along line 2b—2b FIG. 2a.

Figure 3A:
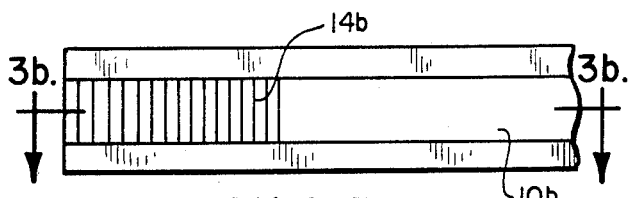

FIG. 3a is a top plan view of a scale which incorporates a second preferred embodiment of this invention.

Figure 3B:
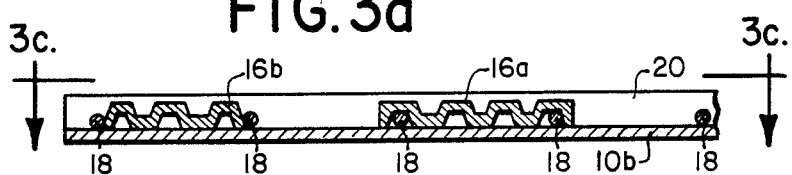

FIG. 3b is a longitudinal sectional view taken along line 3b—3b of FIG. 3a.

Figure 3C:
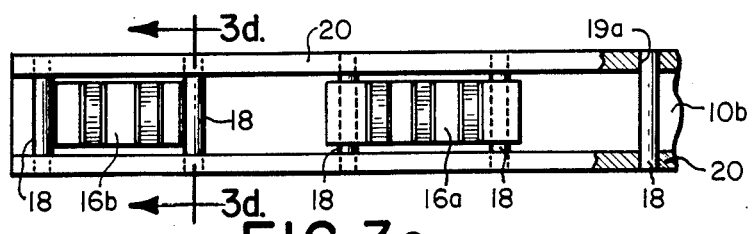

FIG. 3c is a bottom plan view taken along line 3c—3c of FIG. 3b.

Figure 3D:
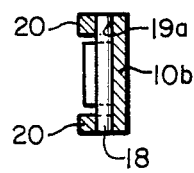

FIG. 3d is a cross-sectional view taken along line 3d—3d of FIG. 3c.

Figure 4A:
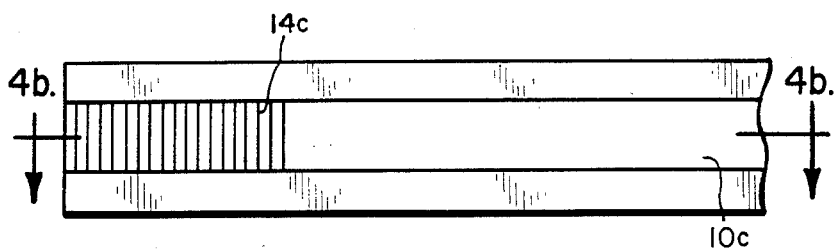

FIG. 4a is a top plan view of a scale which incorporates a third preferred embodiment of this invention.

Figure 4B:
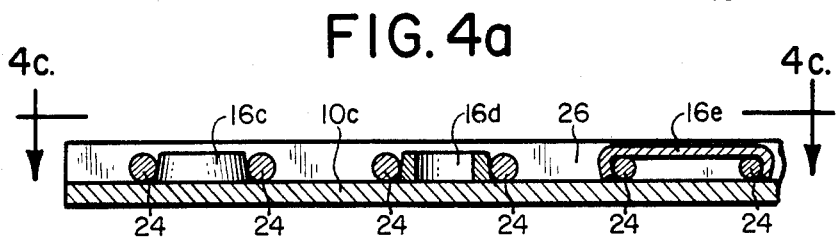

FIG. 4b is a longitudinal sectional view taken along line 4b—4b of FIG. 4a.

Figure 4C:
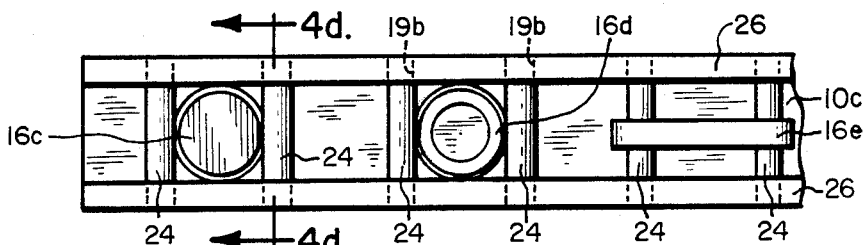

FIG. 4c is a bottom plan view taken along line 4c—4c of FIG. 4b.

Figure 4D:
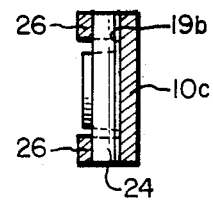

FIG. 4d is a cross-sectional view taken along line 4d—4d of FIG. 4c.

Figure 5A:
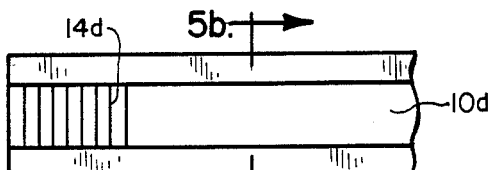

FIG. 5a is a top plan view of a scale which incorporates a fourth preferred embodiment of this invention.

Figure 5B:
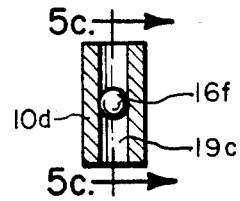

FIG. 5b is a cross-sectional view taken along line 5b—5b of FIG. 5a.

Figure 5C:
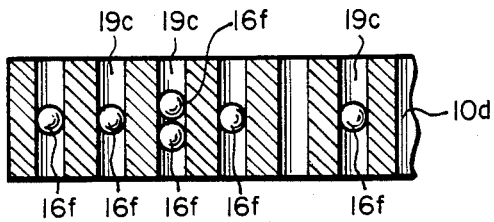

FIG. 5c is a longitudinal sectional view taken along 5c—5c of FIG. 5b.

Figure 6A:
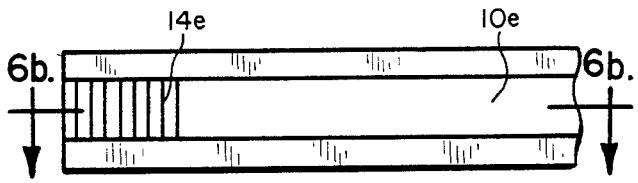

FIG. 6a is a top plan view of a scale which incorporates a fifth preferred embodiment of this invention.

Figure 6B:
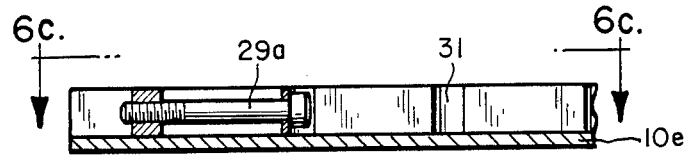

FIG. 6b is a longitudinal sectional view taken along line 6b—6b of FIG. 6a.

Figure 6C:
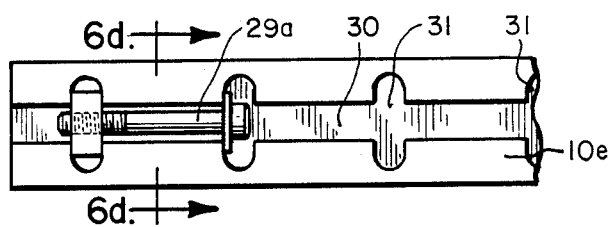

FIG. 6c is a bottom plan view taken along line 6c—6c of FIG. 6b.

Figure 6D:
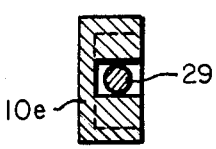

FIG. 6d is a cross-sectional view taken along line 6d—6d of FIG. 6c.

Figure 7A:
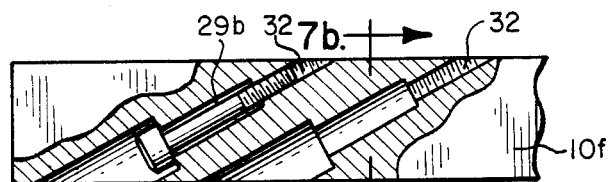

FIG. 7a is a bottom plan view in partial cutaway of a scale which incorporates a sixth preferred embodiment of this invention.

Figure 7B:
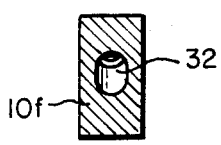

FIG. 7b is a cross-sectional view taken along line 7b—7b of FIG. 7a.

Figure 8A:
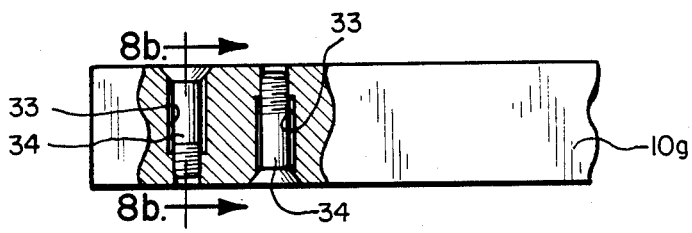

FIG. 8a is a bottom plan view in partial cutaway of a scale which incorporates a seventh preferred embodiment of this invention.

8b is a cross-sectional view taken along lines 8b—8b of FIG. 8a.

Figure 9B:
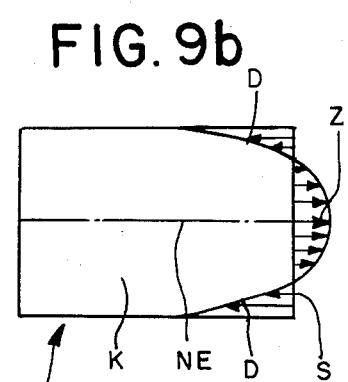
Figure 9A:
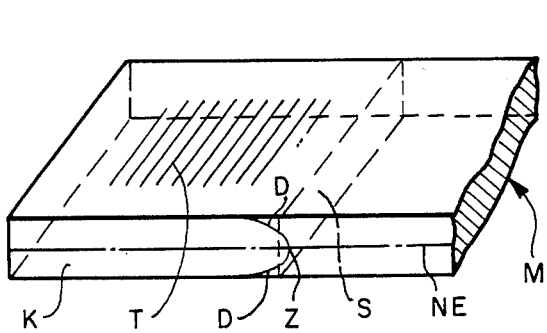

FIG. 9a is a perspective view of a metal scale suitable for use in the method of this invention.

FIG. 9b is a schematic view of the distribution of faces perpendicular to plane S of FIG. 9a.

Figure 9C:
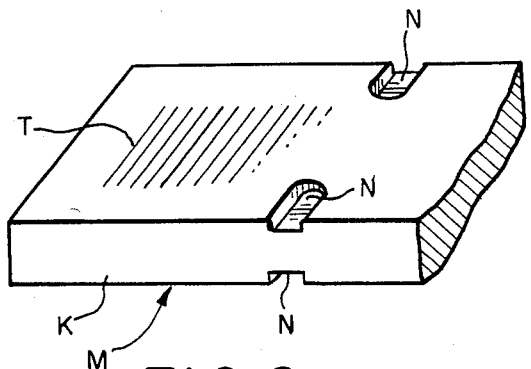

FIG. 9c is a perspective view of the scale of FIG. 9a after being processed to correct errors.

DETAILED DESCRIPTION OF THE PRESENTLY PREFERRED EMBODIMENTS

Figure 1A:
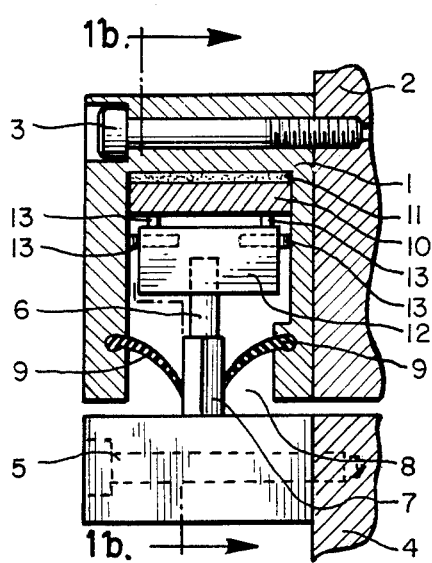
FIG. 1a is a cross-sectional view of a length measuring system in which the error correction system of this invention can be used.
Figure 1B:
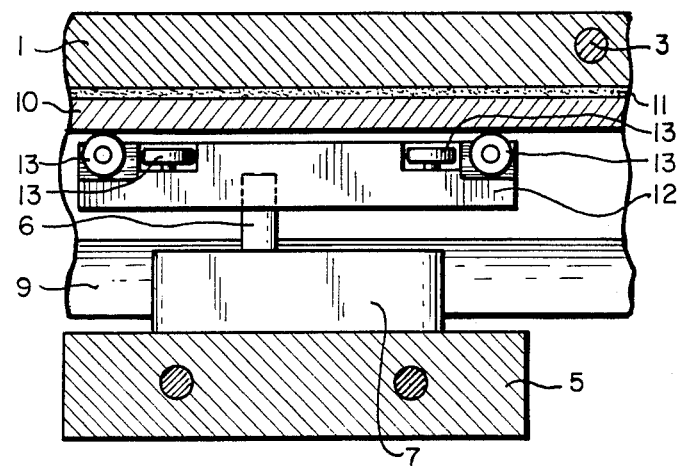

Turning now to the drawings, FIGS. 1a and 1b show two views of a length measuring device which includes a housing 1. In this embodiment, the housing 1 takes the form of a hollow profile which is fastened to a bed 2 of a processing machine (not shown) by means of a screw connection 3. The processing machine includes a slide piece 4 on which is mounted a mounting foot 5. This mounting foot 5 defines a follower 6 which defines a sword-shaped, tapered region 7 positioned to extend through a slit 8 formed in the otherwise completely enclosed housing 1. Resilient sealing lips 9 are positioned to close the slit 8 around the sword-shaped, tapered region 7 in order to prevent dirt or other contamination from penetrating into the interior of the housing 1. A measuring scale 10 is mounted to an inner surface of the housing 1 by means of a resilient adhesive layer 11. A scanning unit 12 is positioned within the housing 1 to abut the scale 10 by means of rollers 13. The scanning unit 12 includes means (not shown) for illuminating the scale, a scanning plate, and a plurality of photosensors for scanning a graduation 14 defined by the scale 10. These photosensors generate periodic analog signals in scanning the graduation 14, which signals are supplied to an evaluating and display unit (not shown) which operates to display the relative position between the slide piece 4 and the bed 2 digitally. Relative movement of the slide piece 4 with respect to the bed 2 is transferred by the follower 6 to the scanning unit 12. In FIGS. 1a and 1b, the scale 10 acts as a carrier for the graduation 14.

FIGS. 2a–9c represent a number of alternative preferred embodiments of the error correction system of this invention. Scales 10a–10g of FIGS. 2a–8b and scale M of FIGS. 9a–9c can be used for example as the scale 10 of the measuring device of FIGS. 1a, 1b.

FIGS. 2a and 2b show plan and cross-sectional views of a metal scale 10a which defines a graduation 14a. A number of depressions or notches 15 are pressed into the outer surfaces of the scale 10a in accordance with a particular desired error correction course in order to generate longitudinal tensions within the scale 10a, and thereby to bring about localized length variations (expansions) of the scale 10a. Preferably, the depressions 15 are pressed into surfaces of the scale 10a by means of conical or wedge-shaped tools (not shown) or by the rolling of deformations into the scale 10a.

FIGS. 3a–3d show four views of a scale 10b which defines a graduation 14b. This scale 10b incorporates a second preferred embodiment of the error correction system of this invention. In this embodiment, a plurality of spring elements in the form of a tension spring 16a and a compression spring 16b are provided to generate longitudinal forces in the scale 10b in order to bring about localized length changes of the scale 10b according to a particular desired error correction course. Both the springs 16a and 16b are coupled to the scale 10b by means of bolts 18 which are positioned in bores 19a in longitudinally running edge strips 20 of the scale 10b. These bolts 18 are oriented transversely to the longitudinal extent of the scale 10b. In alternate embodiments the spring elements may be mounted to the carrier such that spring forces developed by the spring elements are applied to the carrier in a direction oriented obliquely to the longitudinal extent of the carrier.

FIGS. 4a–4d show two plan views and two sectional views of a scale 10c which defines a graduation 14c and incorporates a third preferred embodiment of this invention. In this embodiment, a plurality of spring elements which take the form of a conical plate 16c, a conical ring 16d, and a clamp 16e are provided to generate longitudinal forces which act to bring about localized length changes of the scale 10c according to the desired error correction course. Each of the plate 16c, the ring 16d, and the clamp 16e acts on a respective pair of bolts 24 oriented transversely to the longitudinal extent of the scale 10c. As before, the bolts 24 are fastened in bores 19b in longitudinally running border strips 26 of the scale 10c. The conical plate 16c and the conical ring 16d are clamped between two bolts 24 in each case, in order to bring about an expansion or elongation of the scale 10c in the zone of these elements. On the other hand, the clamp 16e grips around two bolts 24 in order to bring about a compression of the scale 10c in the zone of the clamp 16e. The elasticity of the bolts 24 contributes to the spring action of the elements 16c, 16d, 16e.

FIGS. 5a–5c are a plan and two sectional views of a measuring scale 10b which defines a measuring graduation 14d and incorporates a fourth preferred embodiment of this invention. In this embodiment, a plurality of spring elements in the form of balls 16f are provided and are pressed into place into equidistant bores 19c oriented transversely to the longitudinal extent of the scale 10d and parallel to the graduation 14d. These balls 16f are somewhat larger in diameter than are the bores 19c, and the balls 16f thereby generate longitudinal tensions which result in localized length changes of the scale 10d in accordance with a desired error correction course. The number of balls 16f pressed into individual bores 19c determines the extent of the expansion or elongation of the scale 10d at any one region. In alternate embodiments, cylindrical pins may be substituted for the balls 16f.

In a manner not shown, expansion screws can also be used as spring elements. As used herein the term "expansion screw" is used to designate a screw having a shaft which is drilled or tapered. Such screws are often used in applications which encounter abrupt tensile stress, as in connecting rods for internal combustion engines. Furthermore, the bolts 18,24 can be replaced by transversely running slits in the scale body, by crosspieces in the scale body, or by offsets defined by the scale body.

FIGS. 6a–6d provide two plan views and two sectional views of a scale 10e which defines a graduation 14e and incorporates a fifth preferred embodiment of this invention. In this embodiment, longitudinal forces are generated in the scale 10e for localized length changes in the scale 10e in accordance with the desired error correction course. In this embodiment, these longitudinal forces are brought about by longitudinally running tension screws 29a which are arranged in longitudinal grooves 30 such that the head and the nut of the tension screw 29a bear on transverse grooves 31 defined by the scale 10e. By rotating the tension screw 29a, the region between the nut and head of the tension screw 29a can be placed in compression in order to compress the region of the scale 10e in the zone of the tension screw 29a. In a manner not shown, pressure screws can be substituted for the tension screws 19a in order to exert tension on the scale 10e and thereby expand the scale locally.

FIGS. 7a and 7b are longitudinal and cross-sectional views of a scale 10f. The scale 10f defines an array of partially threaded bores 32, which are oriented obliquely to the longitudinal extent of the scale 10f. Tension screws 29b are positioned in the threaded bores 32 in order to exert compressive forces on the scale 10f between the head of the tension screw 29b and the portion of the screw 19b threadedly engaged with the bore 32. The tension screws 29b operate similarly to the tension screws 29a to compress localized regions of the scale 10f in order to bring about the desired error correction.

Figure 8B:
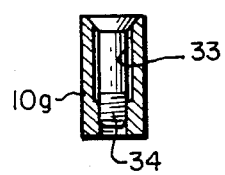

FIGS. 8a and 8b are a cutaway and a cross-sectional view, respectively, of a scale 10g in which tension screws 34 are arranged transversely to the longitudinal extent of the scale 10g in partially threaded bores 33. When the tension screws 34 are tightened, the scale 10g is compressed transversely to the longitudinal extent of the scale 10g. This is because compressive forces are developed between the portion of the scale 10g adjacent the screw head and the portion of the scale 10g adjacent the threaded portion of the bore 33. The transverse contractions in the scale 10g brought about by the tension screws 34 cause longitudinal tension forces to be developed in the scale 10g, thereby causing localized expansion of the scale 10g in accordance with the desired error correction course.

Alternate embodiments of this invention utilize scales or carriers for scales in which by reason of thermal or mechanical pretreatment there is present a predetermined longitudinal tension. In these embodiments of the invention, this predetermined longitudinal tension is released in a localized and variable manner in order to bring about desired localized length changes to the scale according to the particular desired error correction course. This releasing of the predetermined longitudinal tension can be brought about by reducing the cross-sectional size of the scale by chemical means (chemical etching), physical means (plasma etching), mechanical means (boring, milling, grinding, engraving, sand-blasting), or by thermal means (laser shaping).

FIGS. 9a, 9b, 9c will be used to describe one preferred embodiment of the method of this invention. This first step in this method is to provide a measuring scale, such as the scale M, which is characterized by a predetermined distribution of internal longitudinal forces. In FIG. 2a, the scale M comprises a scale body K which defines a measuring graduation T on one surface. In this embodiment, the scale M is formed of a metal, and may be produced by rolling, for example. Standard rolling processing steps generate longitudinal forces extending along the length of the scale M, transversely to an imaginery section plane S oriented transversely to the longitudinal extent of the scale M. FIG. 9b is a force diagram showing the distribution of these longitudinal forces perpendicular to the section plane S. As shown in FIG. 9b, the forces developed in the scale M are symmetrical with respect to the neutral plane NE of the scale. These longitudinal forces vary in a progressive and continuous manner from a maximum compressive force D at the surface of the scale body K (tending to contract the scale M) to a maximum tensile force Z in the neutral plane NE (tending to expand the scale M).

The next step in this method is to calibrate the measuring graduation T to determine errors in the graduation T to be corrected. Based on the results of this calibration, a desired error correction course is then determined.

The third step in this method is to control a material removing tool (preferably with the aid of a computer) according to the desired error correction course in order to remove material from the scale M to alter the balance between the compressive longitudinal forces D and the tensile longitudinal forces Z in the scale body K. For example, FIG. 9c shows a plurality of lateral grooves N milled into the surfaces of the scale body K. Such grooves N operate to reduce or eliminate compressive forces in the region of the grooves N, thereby shifting the equilibrium of balance between the compressive forces D and the tensile forces Z in favor of the tensile forces Z. This shift of the equilibrium causes the scale body K to expand in the region of the zones N as necessary for the establishment of a new equilibrium between the remaining compressive forces D and the tensile forces Z. In this manner, the desired error correction can be accomplished simply and reliably, without adding additional components of any type to the scale M.

Of course, it should be understood that a wide range of changes and modifications to the preferred embodiments described above will be apparent to those skilled in the art. It is, therefore, intended that the foregoing detailed description be regarded as illustrative rather than limiting, and that it be understood that it is the following claims, including all equivalents, which are intended to define the scope of this invention.

I claim:

1. In a length or angle measuring device comprising a planar graduation carrier, which includes a measuring graduation, and a scanning unit, which scans the measuring graduation, wherein the scanning unit and the carrier are adapted to be coupled to two objects which are movable with respect to each other, the improvement comprising:

means for applying localized longitudinal forces to the carrier independently of any externally applied forces, which localized longitudinal forces are exerted parallel to a plane defined by the carrier and are variable along the longitudinal extent of the carrier to cause localized variations in the length of the carrier substantially without deflection of the carrier transverse to said plane, in order to bring about nonlinear length variations in the graduation in accordance with a desired error correction course.

2. The invention of claim 1 wherein the applying means comprises a plurality of depressions pressed into at least one outer surface of the carrier, which depressions are effective to generate said localized longitudinal forces in the carrier in a region around the depressions.

3. The invention of claim 1 wherein the applying means comprises:

at least one spring element; and means for mounting the at least one spring element to the carrier such that spring forces developed by the spring element are applied to the carrier in a direction having a component extending along the longitudinal extent of the carrier.

4. The invention of claim 3 wherein the spring forces developed by the spring element are compressive forces.

5. The invention of claim 3 wherein the spring forces developed by the spring element are tensile forces.

6. The invention of claim 3 wherein the spring forces developed by the spring element are applied to the carrier in a direction oriented parallel to the longitudinal extent of the carrier.

7. The invention of claim 1 wherein the applying means comprises at least one screw coupled to the carrier to exert forces on the carrier having a component extending along the longitudinal extent of the carrier.

8. The invention of claim 7 wherein the screw exerts compressive forces on the carrier.

9. The invention of claim 8 wherein the compressive forces are applied parallel to the longitudinal extent of the scale.

10. The invention of claim 8 wherein the compressive forces are applied obliquely to the longitudinal extent of the scale.

11. The invention of claim 7 wherein the screw exerts tension forces on the scale.

12. The invention of claim 1 wherein the applying means comprises means for applying compressive forces to the carrier oriented transversely to the longitudinal extent of the carrier.

13. The invention of claim 1 wherein the carrier defines a plurality of passages therein, and wherein the applying means comprises a plurality of expansion elements sized larger than the passages to exert longitudinal forces on the carrier when placed in the passages.

14. The invention of claim 1 wherein the measuring device comprises an element which serves to mount the carrier and wherein said applying means operates independently of the element.

15. In a length or angle measuring device comprising a graduation carrier, which includes a measuring graduation, and a scanning unit, which scans the measuring graduation, wherein the scanning unit and the carrier are adapted to be coupled to two objects which are movable with respect to each other, the improvement comprising:

means, included in the carrier, for developing a preset longitudinal force in the carrier; and means for varying the preset longitudinal force in the carrier along the longitudinal extent of the carrier to cause localized variations in the length of the carrier in order to bring about nonlinear length variations in the graduation in accordance with a desired error correction course.

16. The invention of claim 15 wherein the varying means comprises at least one region of the carrier of reduced cross-sectional size as compared with another region of the carrier.

17. The invention of claim 16 wherein the reduction in cross-sectional size is formed chemically.

18. The invention of claim 16 wherein the reduction in cross-sectional size is formed physically.

19. The invention of claim 16 wherein the reduction in cross-sectional size is formed mechanically.

20. The invention of claim 16 wherein the reduction in cross-sectional size is formed thermally.

21. A method for providing error correction to a carrier which includes a measuring graduation adapted to be scanned by a scanning unit in a measuring instrument, said method comprising the following steps:

(a) providing a carrier which includes a measuring graduation, which carrier comprises a first portion characterized by a predetermined longitudinal force tending to alter the longitudinal extent of the carrier, and a second portion, which counteracts the predetermined longitudinal force;

(b) measuring the graduation to calibrate the graduation and to determine a desired error correction course; and then (c) removing material from the second portion to reduce the cross-section of the second portion at selected places along the longitudinal extent of the carrier in accordance with the desired error correction course in order to cause localized variations in the length of the carrier and to bring about nonlinear length variations in the graduation in accordance with the desired error correction course.

* * * * *

UNITED STATES PATENT AND TRADEMARK OFFICE
CERTIFICATE OF CORRECTION

PATENT NO. : 4,517,742
DATED : May 21, 1985
INVENTOR(S) : Alfons Ernst

It is certified that error appears in the above-identified patent and that said Letters Patent is hereby corrected as shown below:

IN THE REFERENCES CITED
U.S. PATENT DOCUMENTS

Please add the following:

4,060,903  12/1977  Ernst......................33/125C
    4,170,829  10/1979  Nelle......................33/125C

IN THE FOREIGN PATENT DOCUMENTS

Please add the following:

2,518,745   8/1977  Fed. Rep. of Germany......33/125C
    2,735,154  10/1978  Fed. Rep. of Germany......33/125C

IN THE BRIEF DESCRIPTION OF THE DRAWINGS

In column 2, line 10, please insert --FIG.-- at the beginning of the sentence;

In column 2, line 13, please delete "2b-2b FIG. 2a." and substitute therefor --2b-2b of FIG. 2a.--;

UNITED STATES PATENT AND TRADEMARK OFFICE
CERTIFICATE OF CORRECTION

PATENT NO. : 4,517,742
DATED : May 21, 1985
INVENTOR(S) : Alfons Ernst

Page 2 of 2

It is certified that error appears in the above-identified patent and that said Letters Patent is hereby corrected as shown below:

In column 2, line 52, please insert --FIG.-- at the beginning of the sentence.

Signed and Sealed this

Twenty-second Day of March, 1988

Attest:

DONALD J. QUIGG

Attesting Officer

Commissioner of Patents and Trademarks